(12) United States Patent
Sunabashiri

(10) Patent No.: US 7,114,744 B2
(45) Date of Patent: Oct. 3, 2006

(54) AIRBAG APPARATUS AND RELATED METHOD

(75) Inventor: Yukisada Sunabashiri, Machida (JP)

(73) Assignee: Nissan Motor Co., Ltd., Yokohama (JP)

( * ) Notice: Subject to any disclaimer, the term of this patent is extended or adjusted under 35 U.S.C. 154(b) by 242 days.

(21) Appl. No.: 10/779,763

(22) Filed: Feb. 18, 2004

(65) Prior Publication Data

US 2004/0164530 A1 Aug. 26, 2004

Related U.S. Application Data

(60) Provisional application No. 60/493,357, filed on Aug. 8, 2003.

(30) Foreign Application Priority Data

Feb. 20, 2003 (JP) .............................. 2003-042584

(51) Int. Cl.
*B60R 21/16* (2006.01)
(52) U.S. Cl. ................................. 280/730.2
(58) Field of Classification Search ............. 280/730.2, 280/730.1, 743.1, 728.1
See application file for complete search history.

(56) References Cited

U.S. PATENT DOCUMENTS 6,758,490 B1 * 7/2004 Hoeft et al. ............. 280/730.2

FOREIGN PATENT DOCUMENTS

| JP | 3329277 | 7/2002 |
|---|---|---|
| JP | 2004-058848 A | 2/2004 |

* cited by examiner

*Primary Examiner*—Faye M. Fleming
(74) *Attorney, Agent, or Firm*—Foley & Lardner LLP

(57) ABSTRACT

An airbag apparatus for a vehicle is provided with an airbag whose upper end portion is fixed to a vehicle body over a longitudinal direction of the vehicle body between an upper portion of the vehicle body and an interior member in a vehicle compartment and which is adapted to develop in a curtain-like shape downwardly, an inflator adapted to generate gas fed to the airbag, a folded portion formed by folding the airbag, and a turned-back portion formed by turning back a portion of the airbag positioned between the upper end portion and the folded portion so as to be provided with a first turned-back portion positioned on the side of the vehicle compartment and a second turned-back portion positioned between the first turned-back portion and the folded portion. At least one of the first turned-back portion and the second turned-back portion is turned in between the folded portion and the vehicle body.

10 Claims, 5 Drawing Sheets

AIRBAG APPARATUS AND RELATED METHOD

BACKGROUND OF THE INVENTION

The present invention relates to an airbag apparatus and a related method, and in particular to an airbag apparatus for a vehicle whose development characteristic has been controlled and its related method.

In recent years, it has been proposed to provide an airbag apparatus for protecting the head of a vehicle occupant at a time of a side collision or a lateral overturning at an upper portion within a vehicle compartment of an automobile. Such an airbag apparatus is arranged such that the entire of an airbag is folded in a roll shape or a bellows shape and accommodated in a state that an upper end portion of the air bag has been fixed to a side roof rail at an upper portion of a vehicle body and a portion of the airbag which is positioned on the side of a vehicle compartment is covered with a head lining which is an interior member of the automobile. Then, in a case of a side collision or a lateral overturning of the vehicle, the air bag is inflated by gas from an inflator and it is developed in a curtain shape downward while pushing and opening a lower end portion of the head lining inward of the vehicle compartment, thereby protecting the head of a vehicle occupant.

Japanese Patent Publication No. 3329277 discloses an airbag apparatus having a structure where a turned-back portion of an airbag is provided between a vehicle body and a folded portion of the airbag, so that the folded portion itself is pressed toward the head lining by first inflating the turned-back portion and the air bag is developed inward of the vehicle compartment, while the head lining is pushed and opened by the folded portion itself.

SUMMARY OF THE INVENTION

According to the present inventor's investigation, however, in such an airbag apparatus, since such a structure is employed that the folded portion of the airbag itself is pressed to the head lining to push and open the head lining by first inflating the turned-back portion of the air bag, a resistance occurring when the folded portion is developed increases necessarily, which may influence a developing speed and a developing direction of the airbag.

As a result of the present inventor's investigation, the present invention has been achieved, and an object of present invention is to provide an airbag apparatus for a vehicle which can achieve improvement of a developing speed of an airbag and can stabilize a developing direction thereof and its related method.

In order to achieve the above object, according to an aspect of the present invention, there is provided an airbag apparatus for a vehicle, comprising: an airbag whose upper end portion is fixed to a vehicle body over a longitudinal direction of the vehicle body between an upper portion of the vehicle body and an interior member in a vehicle compartment and which is adapted to develop in a curtain-like shape downwardly; an inflator adapted to generate gas fed to the airbag; a folded portion formed by folding the airbag; and a turned-back portion formed by turning back a portion of the airbag positioned between the upper end portion and the folded portion so as to be provided with a first turned-back portion positioned on the side of the vehicle compartment and a second turned-back portion positioned between the first turned-back portion and the folded portion, at least one of the first turned-back portion and the second turned-back portion being turned in between the folded portion and the vehicle body.

On the one hand, according to another aspect of the present invention, there is provided a winding method of an airbag for a vehicle whose upper end portion is fixed to a vehicle body along a longitudinal direction of the vehicle between an upper portion of the vehicle body and an interior member in a vehicle compartment and which is adapted to develop downward in a curtain shape, the method comprising: folding the airbag to form a folded portion; and turning back a portion of the airbag between the upper end portion of the airbag and the folded portion to form a turned-back portion so as to be provided with a first turned-back portion positioned on the side of the vehicle compartment and a second turned-back portion positioned between the first turned-back portion and the folded portion, at least one of the first turned-back portion and the second turned-back portion being turned in between the folded portion and the vehicle body.

Other and further features, advantages, and benefits of the present invention will become more apparent from the following description taken in conjunction with the following drawings.

DETAILED DESCRIPTION OF THE PREFERRED EMBODIMENTS

An airbag apparatus AB for a vehicle and its related method according to an embodiment of the present invention will be explained in detail below with reference to FIG. 1 to FIG. 5. In respective figures, a front direction of an automobile which is a vehicle is denoted by arrow FR, a rear direction thereof is denoted by arrow RR, an up direction is denoted by arrow UPR, a down direction is denoted by arrow LWR, a right direction is denoted by arrow R and a left direction is denoted by arrow L.

Figure 1:
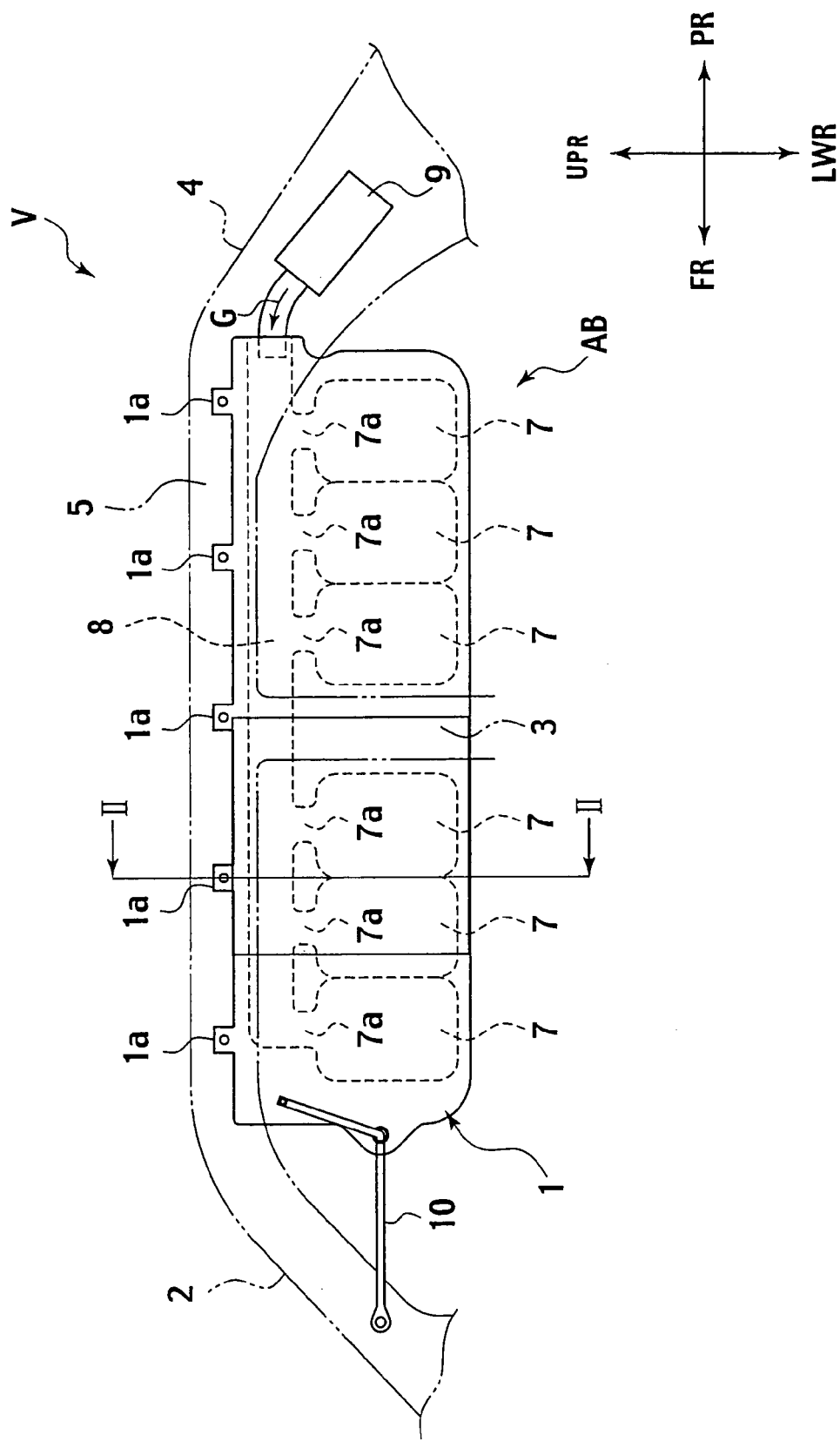
FIG. 1 is a side view of an airbag apparatus for a vehicle according to an embodiment of the present invention, which shows a state that an airbag has been developed downwardly in a curtain-like shape.
Figure 2:
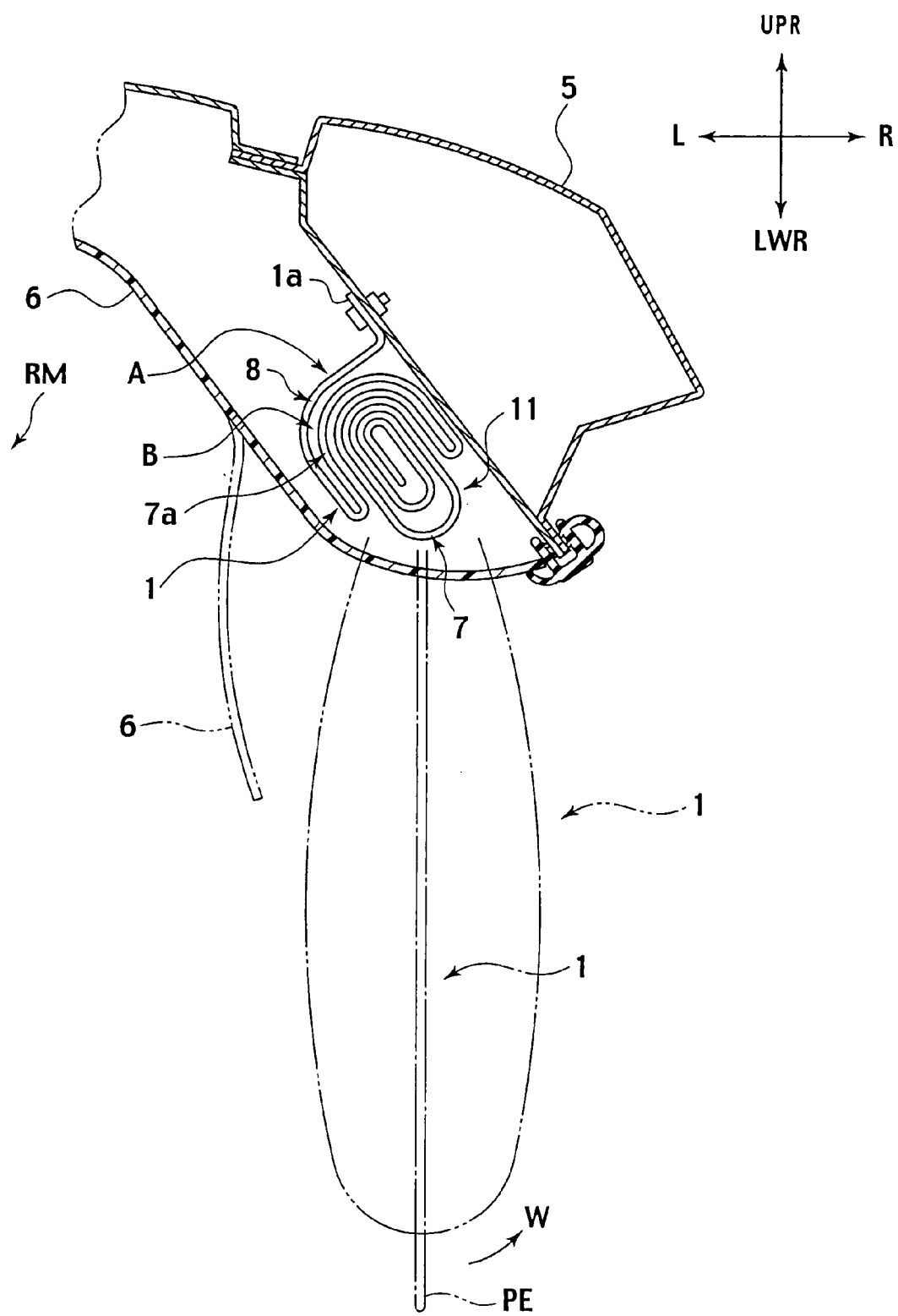
FIG. 2 is a sectional view of the airbag apparatus for a vehicle taken along line II—II in FIG. 1, which mainly shows a state that the airbag has been folded and accommodated, according to the present embodiment.
Figure 3:
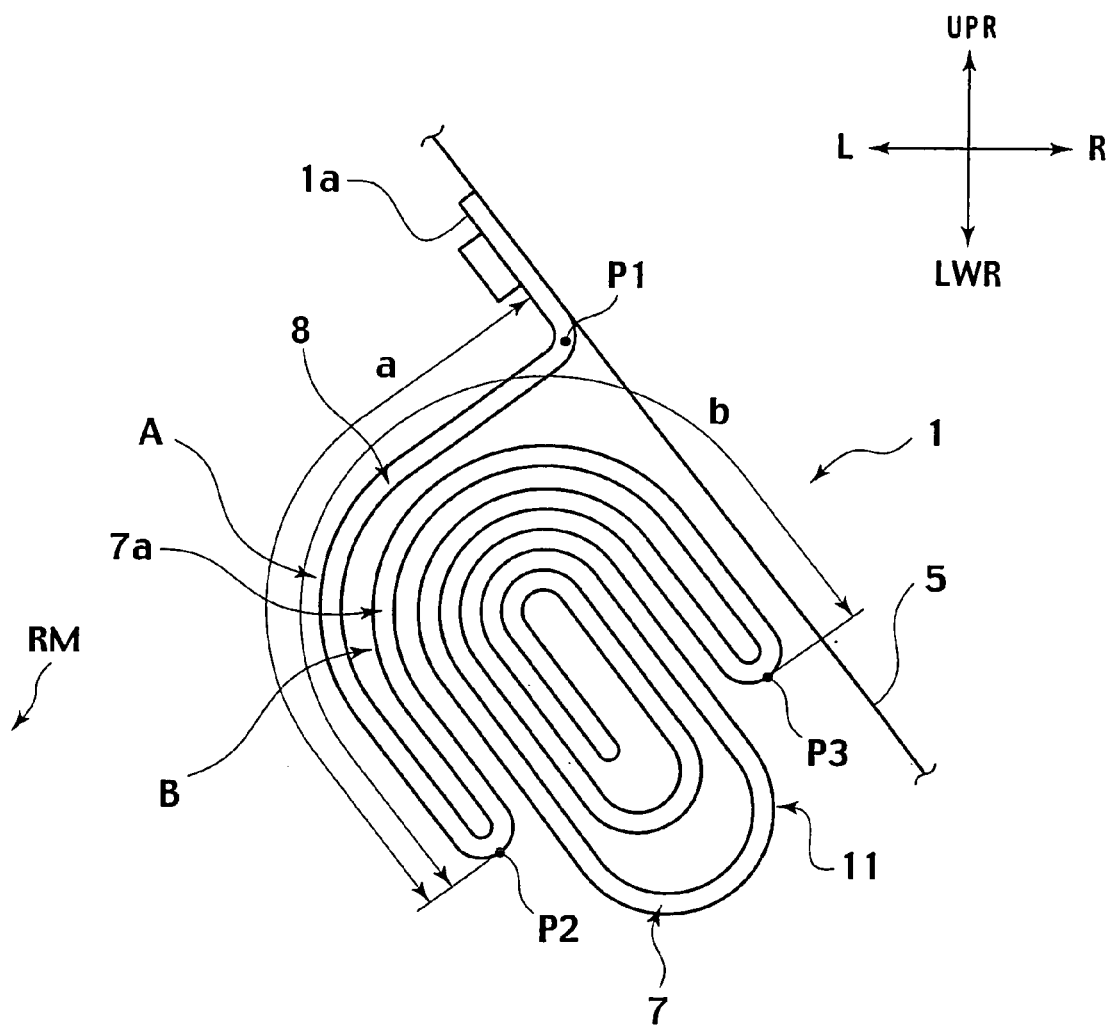
FIG. 3 is an enlarged sectional view of the airbag apparatus for a vehicle, which shows a state that the airbag in FIG. 2 has been folded in an enlarged manner, according to the present embodiment.
Figure 4:
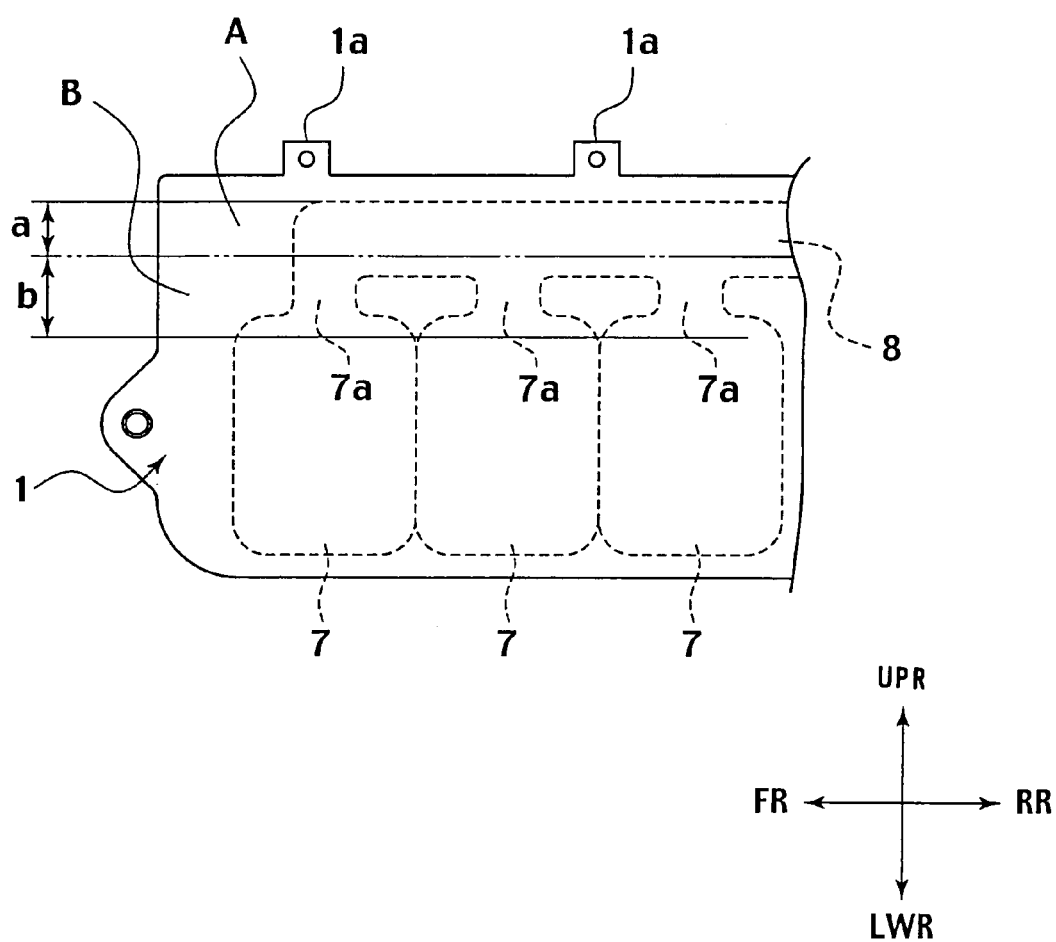
FIG. 4 is an enlarged side view of FIG. 1 for showing a range of a first turned-back portion and a second turned-back portion of the airbag of the airbag apparatus for a vehicle, according to the present embodiment.

FIG. 1 is a side view of an airbag apparatus for a vehicle according to this embodiment, which shows a state that an airbag has been developed downward in a curtain shape, FIG. 2 is a sectional view of the airbag apparatus taken along line II—II in FIG. 1, which mainly shows a state that the airbag has been folded and accommodated, FIG. 3 is an enlarged sectional view of the airbag apparatus, which shows a state that the airbag in FIG. 2 has been folded and accommodated in an enlarged manner, and FIG. 4 is an enlarged side view of FIG. 1 for showing a range of a first turned-back portion and a second turned-back portion of the airbag of the airbag apparatus.

As shown FIG. 1, as a matter of explanatory convenience, an airbag 1 has been developed in a curtain shape when an upper portion of an automobile V which is a vehicle is viewed from a vehicle compartment RM side. In the automobile, a front pillar 2, a center pillar 3 and a rear pillar 4 are provided as some sections of a vehicle body thereof, and a side roof rail 5 having a closed sectional structure extending along a longitudinal direction of the automobile is formed above the front pillar 2, the center pillar 3 and the rear pillar 4. The airbag 1 is provided so as to extend from the front pillar 2 to the rear pillar 4 along the side roof rail 5.

More in detail, the airbag 1 is accommodated and held in a case (not shown) in a state that mounting pieces 1a of an upper end portion thereof have been fixed to the side roof rail 5 and the airbag has been typically folded as shown in FIGS. 2 and 3, and it is covered with a head lining 6 which is an interior member regarding the vehicle compartment RM.

As shown in FIG. 1, two sets of three inflating chambers 7, namely six inflating chambers in total, are formed in front and rear of such an airbag 1. An inlet 7a is formed at an upper end of each inflating chamber, and each inlet 7a communicates with a gas introducing passage 8 extending in a longitudinal direction of the automobile at an upper portion of the airbag 1. An inflator 9 which is a gas generator for generating gas G for inflating and developing the airbag 1 is connected to a rear portion of the gas introducing passage 8. Gas from the inflator 9 passes through the gas introducing passage 8 to be introduced into each inflating chamber 7 via each inlet 7a. A strap 10 is provided between a front end of the airbag 1 and the front pillar 2. The strap 10 pulls the airbag 1 forward, when the airbag 1 is developed downwardly. Thus, the strap 10 serves to assist not only development of the airbag 1 in the downward direction but also smooth development thereof in the longitudinal direction.

How to fold the airbag 1 will be explained next mainly with reference to FIGS. 2 and 3. The airbag 1 shown by a dotted chain line in FIG. 2 shows its state before folded, and the airbag 1 shown by a double dotted line shows its inflated state for reference.

First, in the airbag 1, a folded portion 11 is formed in a roll shape obtained by winding a lower end PE of the airbag 1 in a state shown by a dotted line in FIG. 2 to a right side of a wall side of the vehicle compartment, i.e., in a counter-clockwise direction shown by arrow W in FIG. 2, in a so-called "outside winding" roll shape. The term "outside winding" means a rolling method which rolls the airbag 1 by sequentially winding the airbag 1 from the lower end PE toward the side wall of the vehicle compartment.

Then, a portion of the airbag 1 between the folded portion 11 with the roll shape thus rolled and the mounting pieces 1a fixed to the side roof rail 5 is turned-back twice at points P2 and P3 in FIG. 3, and one of the turned-back portions closer to the mounting pieces 1a is defined as a first turned-back portion A (corresponding to a portion between a point P1 and the point P2) and the other thereof closer to the folded portion 11 is defined as a second turned-back portion B (corresponding to a portion between the point P2 and the point P3). That is, the first turned-back portion A and the second turned-back portion B overlapping with each other are formed between the side roof rail 5 and the head lining 6 in the vehicle compartment, and the first turned-back portion A is positioned inward of the vehicle compartment and the second turned-back portion B is positioned outward thereof between the first turned-back portion A and the folded portion 11.

More in detail, as shown in FIG. 3, the first turned-back portion A and the second turned-back portion B are formed such that the length b of the second turned-back portion B (corresponding to a distance between the point P2 and the point P3) is longer than the length "a" of the first turned-back portion A (corresponding to a distance between the point P1 and the point P2) (a<b). For this reason, an upper portion of the second turned-back portion B is put in a state that it has been turned in between the folded portion 11 and the side roof rail 5. As shown in FIG. 4, such a first turned-back portion A corresponds to an upper portion of the gas introducing passage 8 and such a second turned-back portion B corresponds to a lower portion of the gas introducing passage 8, the inlets 7a and upper end portions of the inflating chambers 7.

An operation of the airbag apparatus 1 having the above structure will be explained next.

Figure 5:
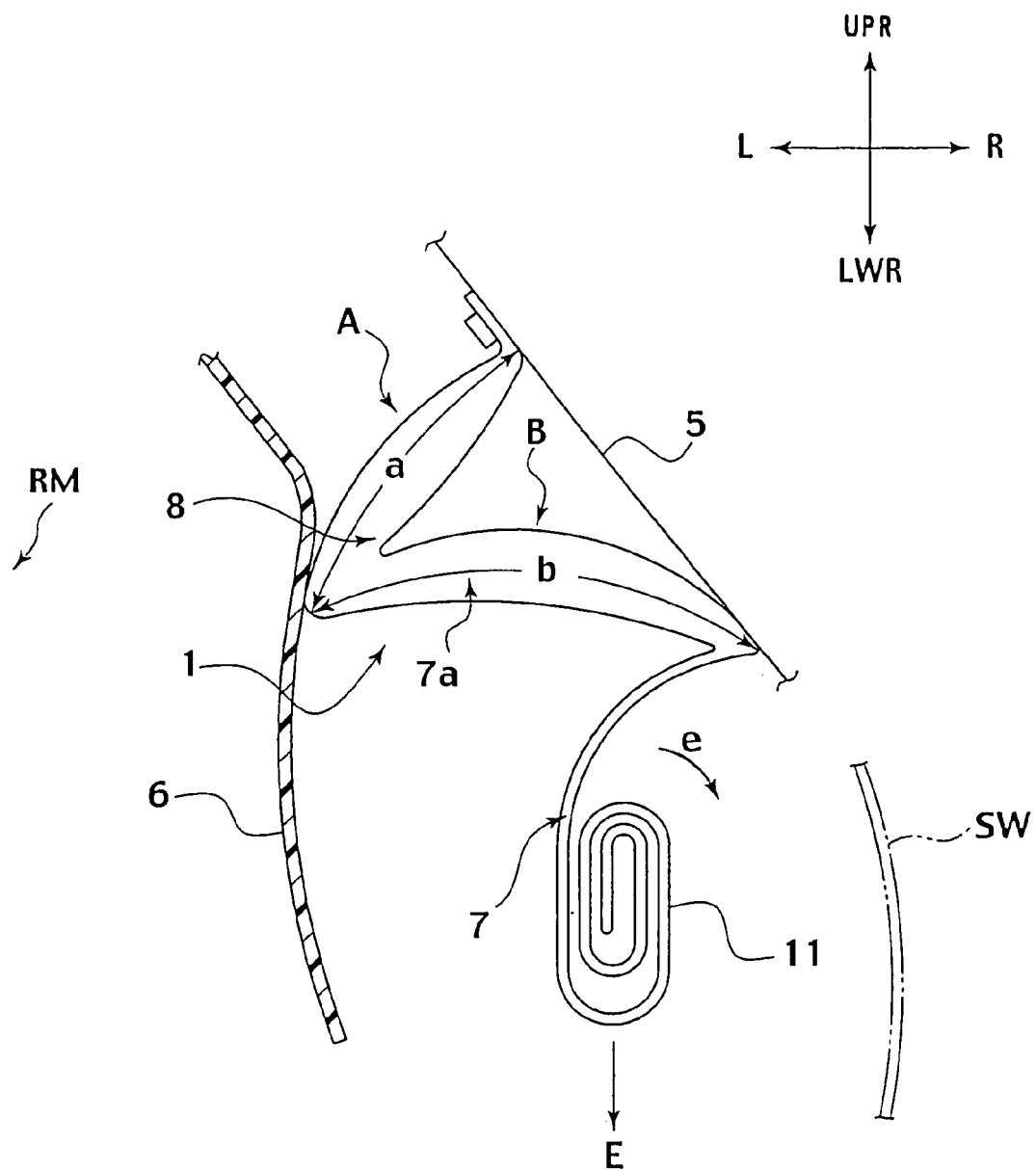
FIG. 5 is a sectional view of the airbag apparatus for a vehicle, which shows a state that the first turned-back portion and the second turned-back portion of the airbag in FIG. 2 have been inflated so that the folded portion has been pushed out, according to the present embodiment.

FIG. 5 is a sectional view of the airbag apparatus showing a state that the first turned-back portion and the second turned-back portion of the airbag apparatus in FIG. 2 have been inflated and the folded portion has been pushed out.

First, in a case that a side collision or a lateral overturning of the automobile has been detected by a sensor (not shown), gas is ejected from the inflator 9.

At that time, the gas ejected first enters the gas introducing passage 8 and reaches the inlet 7a communicating with each inflating chamber 7 while inflating each first turned-back portion A thereby to inflate the second turned-back portion B.

Here, as shown in FIG. 5, since the first turned-back portion A and the second turned-back portion B are inflated so as to project between the head lining 6 and the side roof rail 5, the head lining 6 is pushed and opened inward of the vehicle compartment RM due to actions of the first turned-back portion A and the second turned-back portion B cooperating therewith.

Then, the gas reaches the folded portion 11 corresponding to each inflating chamber 7, and the gas inflates the airbag in the vehicle downward along arrow E as a whole, while the folded portion 11 is unwound in a clockwise direction in FIG. 3, as shown by arrow e. Since the head lining 6 has been already pushed and opened inward of the vehicle compartment RM by the first turned-back portion A and the second turned-back portion B cooperating therewith, the folded portion 11 is pushed out towards the vehicle compartment RM without the folded portion 11 being pressed against the head lining 6. Thereby, a resistance generated when the folded portion 11 develops is considerably reduced so that a developing speed of the airbag 1 is improved and a developing direction thereof is made stable. Further, since the upper portion of the second turned-back portion B has been turned in between the folded portion 11 and the side roof rail 5, a propellant force towards the developing direction E occurs on the folded portion 11 due to inflation of the upper portion of the second turned-back portion B, which is turned-in, so that the developing speed of the airbag 1 is further improved.

Finally, the airbag 1 reaches a developed state that it has been developed downwardly in a curtain shape as shown by a double dotted line in FIG. 2 and it is put for protecting the head of a vehicle occupant.

Here, since the second turned-back portion B includes the inlets 7a of the inflating chambers 7, the gas flows from the inlets 7a into the inflating chambers 7 after the second turned-back portion B has been inflated, namely after the folded portion 11 has been pushed out in a broad space on the vehicle compartment MR side by inflation of the second turned-back portion B. Therefore, the inlets 7a can be opened sufficiently, and smooth introduction of the gas into the inflating chambers 7 can be performed.

In addition, since the folded portion 11 has been folded in the outside winding roll shape, the folded portion 11 is unwound in a clockwise direction and developed while the folded portion 11 maintains a state that it is positioned downward of the side roof rail 5 to be close to the side window SW positioned at a right side of the vehicle compartment. Therefore, at a time of collision or lateral overturning such that a clearance between a vehicle occupant positioned inward of the side window SW and the side window SW becomes narrow, the airbag 1 can reliably be inflated and developed even within the narrow clearance so that the head of the vehicle occupant can be protected.

Incidentally, in this connection, in the above embodiment, the folded portion 11 with the roll shape has been explained as one example, but the present invention is not limited to such a folded portion. The present invention is applicable to a bellows-like folded portion in principle.

According to the structure of the embodiment, since the first turned-back portion having a portion positioned inward of the vehicle compartment and the second turned-back portion communicating therewith are provided in the airbag, the first turned-back portion and the second turned-back portion inflate prior to inflation of the folded portion so that the interior member can be pushed and opened inward of the vehicle compartment by the inflated first and second turned-back portions.

Accordingly, the folded portion is not pressed against the interior member unnecessarily, and a resistance occurring at a time of inflation of the folded portion becomes small, so that the developing speed of the airbag is improved and the developing direction is stabilized.

Further, since the upper portion of the second turned-back potion has been turned in between the folded portion and the vehicle body, the turned-in portion inflates so that a propellant force towards the developing direction is generated on the folded portion and the developing speed of the airbag is further improved.

Furthermore, since the second turned-back portion includes at least the inlets of the inflating chambers, the gas flows from the inlets into the inflating chambers after the second turned-back portion has been inflated, namely after the folded portion has been pushed out in a broad space on the vehicle compartment side by inflation of the second turned-back portion. Therefore, the inlets can be opened sufficiently, and smooth introduction of the gas into the inflating chambers can be performed.

In addition, since the folded portion is formed in the outside wound roll shape obtained by winding the airbag from the lower end thereof to the side wall of the vehicle chamber in a roll shape, the folded portion is unwound and developed while it being approaching to the vehicle body (the window). Therefore, even when a clearance between a vehicle occupant and the vehicle body is narrow, the airbag can reliably be developed within the narrow clearance.

The entire content of a Patent Application No. TOKUGAN 2003-042584 with a filing date of Feb. 20, 2003 in Japan and the entire content of a Provisional Patent Application No. 60/493,357 with a filing date of Aug. 8, 2003 in the United States of America are hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. An airbag apparatus for a vehicle, comprising:
   an airbag whose upper end portion is fixed to a vehicle body over a longitudinal direction of the vehicle body between an upper portion of the vehicle body and an interior member in a vehicle compartment and which is adapted to develop downwardly in a curtain-like shape;
   an inflator adapted to generate gas to be fed to the airbag;
   a folded portion formed by folding the airbag;
   a first turned-back portion extending from an upper end portion of the airbag to a side of the folded portion of the airbag facing the vehicle compartment; and
   a second turned-back portion extending from a lower end of the first turned-back portion to a side of the folded portion facing the vehicle body.

2. The airbag apparatus for a vehicle according to claim 1, wherein the second turned-back portion is set to be longer than the first turned-back portion such that an end of the second turned-back portion is positioned between the folded portion and the vehicle body.

3. The airbag apparatus for a vehicle according to claim 1, wherein the airbag has a plurality of inflating chambers arranged in a longitudinal direction of the vehicle and a gas introducing passage which communicates with inlets at upper ends of the inflating chambers, respectively, and which extends along the longitudinal direction, and wherein the second turned-back portion includes the inlets of the inflating chambers.

4. The airbag apparatus for a vehicle according to claim 1, wherein the folded portion has a rolled shape obtained by winding the airbag from a lower end of the airbag toward a side portion of the vehicle compartment and folding the same.

5. The airbag apparatus for a vehicle according to claim 1, wherein the first turned-back portion and the second turned-back portion press and open the interior member by inflation of the first turned-back portion and the second turned-back portion prior to inflation of the folded portion.

6. The airbag apparatus for a vehicle according to claim 1, wherein the folded portion inflates so as to be close to a side portion of the vehicle compartment.

7. A winding method of an airbag for a vehicle whose upper end portion is fixed to a vehicle body along a longitudinal direction of the vehicle between an upper portion of the vehicle body and an interior member in a vehicle compartment and which is adapted to develop downward in a curtain shape, the method comprising:
   folding the airbag to form a folded portion;
   turning back a portion of the airbag between the upper end portion of the airbag and the folded portion to form a first turned-back portion positioned on a side of the vehicle compartment; and turning back a portion of the airbag between the first turned-back portion and the folded portion to form a second turned-back portion being turned in between the folded portion and the vehicle body.

8. An undeveloped airbag assembly for a vehicle, comprising:

an undeveloped airbag whose upper end portion is adapted to be fixed in a vehicle compartment, the airbag being adapted to develop along a given vector away from a center of mass of the undeveloped airbag in a curtain-like shape, the undeveloped airbag including:

a folded portion formed by folding the airbag;

a first turned-back portion extending from an upper end portion of the airbag to a first side of the folded portion of the airbag; and a second turned-back portion extending from a lower end of the first turned-back portion to a second side of the folded portion about opposite the first side;

wherein the airbag assembly is adapted to hold the folded portion, the first turned-back portion, and the second turned-back portion in their respective positions at least until airbag development.

9. The undeveloped airbag assembly of claim 8, wherein the second turned-back portion extends around about a majority of an outer circumference of the folded portion.

10. The undeveloped airbag assembly of claim 9, wherein the folded portion is spirally folded.

* * * * *